United States Patent
Lutz et al.

(10) Patent No.: US 11,140,041 B2
(45) Date of Patent: Oct. 5, 2021

(54) ARRANGEMENT WITH OPERATOR SERVERS AND OPERATOR CLIENTS

(71) Applicant: Siemens Aktiengesellschaft, Munich (DE)

(72) Inventors: Benjamin Lutz, Pfinztal (DE); Ralf Engert, Karlsruhe (DE); Markus Hoffmann, Landau (DE)

(73) Assignee: Siemens Aktiengesellschaft, Munich (DE)

( * ) Notice: Subject to any disclaimer, the term of this patent is extended or adjusted under 35 U.S.C. 154(b) by 33 days.

(21) Appl. No.: 16/511,690

(22) Filed: Jul. 15, 2019

(65) Prior Publication Data

US 2020/0028751 A1 Jan. 23, 2020

(30) Foreign Application Priority Data

Jul. 17, 2018 (EP) ..................................... 18183958

(51) Int. Cl.
*H04L 12/24* (2006.01)
*H04L 29/06* (2006.01)

(52) U.S. Cl.
CPC .............. *H04L 41/12* (2013.01); *H04L 41/22* (2013.01); *H04L 67/42* (2013.01)

(58) Field of Classification Search
None
See application file for complete search history.

(56) References Cited

U.S. PATENT DOCUMENTS

2006/0218266 A1  9/2006 Matsumoto et al.

FOREIGN PATENT DOCUMENTS

| EP | 3115855 | | 1/2017 | |
|---|---|---|---|---|
| EP | 3115855 A1 | * | 1/2017 | ......... H04L 67/2847 |
| EP | 3276437 | | 1/2018 | |
| JP | 2005/018298 | | 1/2005 | |
| JP | 2017-182103 | | 10/2017 | |
| WO | WO 03/081359 | | 10/2003 | |

OTHER PUBLICATIONS

Siemens Katalog ST PCS7, Chapter 5, Edition 2017.
Office Action (and an German translation) dated Dec. 22, 2020 issued in Japanese Patent Application No. 2019-131203.
Office Action dated Aug. 3, 2021 issued in Japanese Patent Application No. 2019-131203.

* cited by examiner

*Primary Examiner* — Tonia L Dollinger
*Assistant Examiner* — Ishrat Rashid
(74) *Attorney, Agent, or Firm* — Cozen O'Connor (57) ABSTRACT

An arrangement with operator servers and operator clients, wherein process image modules associated with process objects and having tags are stored in the operator servers, where the operator server functions as a local server and the other operator server functions as a remote server, the local server receives the tags stored in the remote servers, where each operator client registers with one of the operator servers to establish a client-server connection, and is also configured to display a system image with block symbols associated with the process objects, and where the local server transmits the process data of the local and the process data of the remote server to the registered operator client via the client-server connection in order to update the block symbols of the system image such that, within the scope of updating a system image, an operator is referred to the communication load between the operator servers.

5 Claims, 7 Drawing Sheets

ARRANGEMENT WITH OPERATOR SERVERS AND OPERATOR CLIENTS

BACKGROUND OF THE INVENTION

1. Field of the Invention

The invention relates to an arrangement with operator servers and with operator clients.

2. Description of the Related Art

Siemens catalog "ST PCS7", chapter 5, 2017 edition discloses a conventional arrangement, which is an integral part of a process control system, has a plurality of operator servers and operator clients and is configured to enable a user-friendly and safe process control, where an operator can monitor both the process flow and also where necessary intervene therein to control it.

Hundreds of system images and several thousands of process objects, e.g., process objects in the form of measuring points, tanks, valves, sensors, actuators, are conventionally to be processed in process control technology, where a process object has a number of associated facets. For instance, a process image stored on operator servers comprises process image modules associated with these process objects or operation- and monitoring-relevant process data of these process objects, an automation device comprises automation modules or control modules (CFCs, SFCs, . . . ) associated with the process objects and furthermore a user interface of the operator clients comprises image and/or block symbols of a system image associated with the process objects as well as what are known as faceplates.

As a rule, an operator server and an operator client each form an operator system. However the rigid client-server connection increasingly "disappears" on account of the use of web technologies, in particular in process technology. This means that web-oriented clients can connect with almost any operator server for control and monitoring purposes. The process data (process variables, process values, tags, or tag addresses) required for the operation and monitoring for the purpose of dynamic sampling of the system images are provided to the operator client, which has registered with one of the operator servers, because this operator server functioning as a local server obtains process data from further operator servers functioning as remote servers and this local server transmits its process data together with the process data obtained from the remote servers to the registered operator client for preparation.

It may occur that the local server must obtain almost all process data required for the opened system image from the remote servers to update a system image. In this case, what is known as a cross-communication load increases between the local server and the remote servers, the response times and the image opening times worsen and, on the server side, the "emergency reserve" moreover reduces in order to be able to suitably react in the event of damage.

SUMMARY OF THE INVENTION

In view of the foregoing, it is therefore an object of the invention to provide an arrangement, via which, within the scope of the update of a system image, an operator is referred to the communication load between the operator servers.

This and other objects and advantages are achieved in accordance with the invention by an arrangement with operator servers in which an operator server functioning as a local server determines, for respective block symbols from at least one data structure of a system image, tags or tag addresses of process image modules and the number of tags or tag addresses of a respective process image module, where the local server proposes a new client-server connection to the registered operator client as a function of the number of tags or tag addresses.

The invention is based on the idea of determining how much process data for updating the block symbols is stored on the local operator server (the server with which a client has registered) and how much of such process data is stored on the remote servers (the servers which supply or provide their process data to the local server). In the event that only minimal process data is stored on the local server and a large amount of such process data for updating the block symbols is stored on the remote servers, the cross-communication load between the local server and the remote operator servers is high, because the local operator server firstly has to obtain the large amount of process data of the remote operator server in order to be able to finally transmit all process data (that of the local server and of the remote servers) to the registered operator client. The high cross-communication load indicates an unfavorable client-server connection. It is indicated or reported to the registered operator client that a more favorable client-server connection can be established. It is therefore suggested to the operator client to register with the remote operator server, on which the majority of process data is stored, as a result of which the cross-communication load would be reduced in the event of registration with this remote server.

It is advantageous if the client-server connection can be determined in a "system image-granular" or "image-individual" manner, which causes the least server communication cross-traffic and thus results in the smallest server-side load.

In one embodiment of the invention, the registered operator client registers with one of the remote servers to establish a new client-server connection as a function of the number of tags or tag addresses of the process image modules after a predetermined time span or after an operator input, where following the registration this remote server functions as a new local server. As a result, a more favorable client-server connection is effected, as a result of which the communication or cross-communication load between the operator servers is kept to a minimum. This is particularly advantageous for system images on big screens or for overview images which have been pending for a long time and require updating, because in these instances a very high number of block symbols requires updating. As a result, e.g., for exceptional situations, a maximum "emergency reserve" is retained on the server side, where the runtime stability of a process control system is furthermore improved. A special engineering is not required for this purpose.

In a further embodiment of the invention, the client-server connections can be visualized on the registered operator client. As a result, an operator is visually referred to a favorable and unfavorable server-client connection, where via an operator input the operator causes the operator client to register with the operator server with the most favorable client-server connection.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its embodiments and advantages are explained in greater detail below on the basis of the drawing in which an exemplary embodiment of the invention is illustrated, in which.

DETAILED DESCRIPTION OF THE EXEMPLARY EMBODIMENTS

Figure 1:
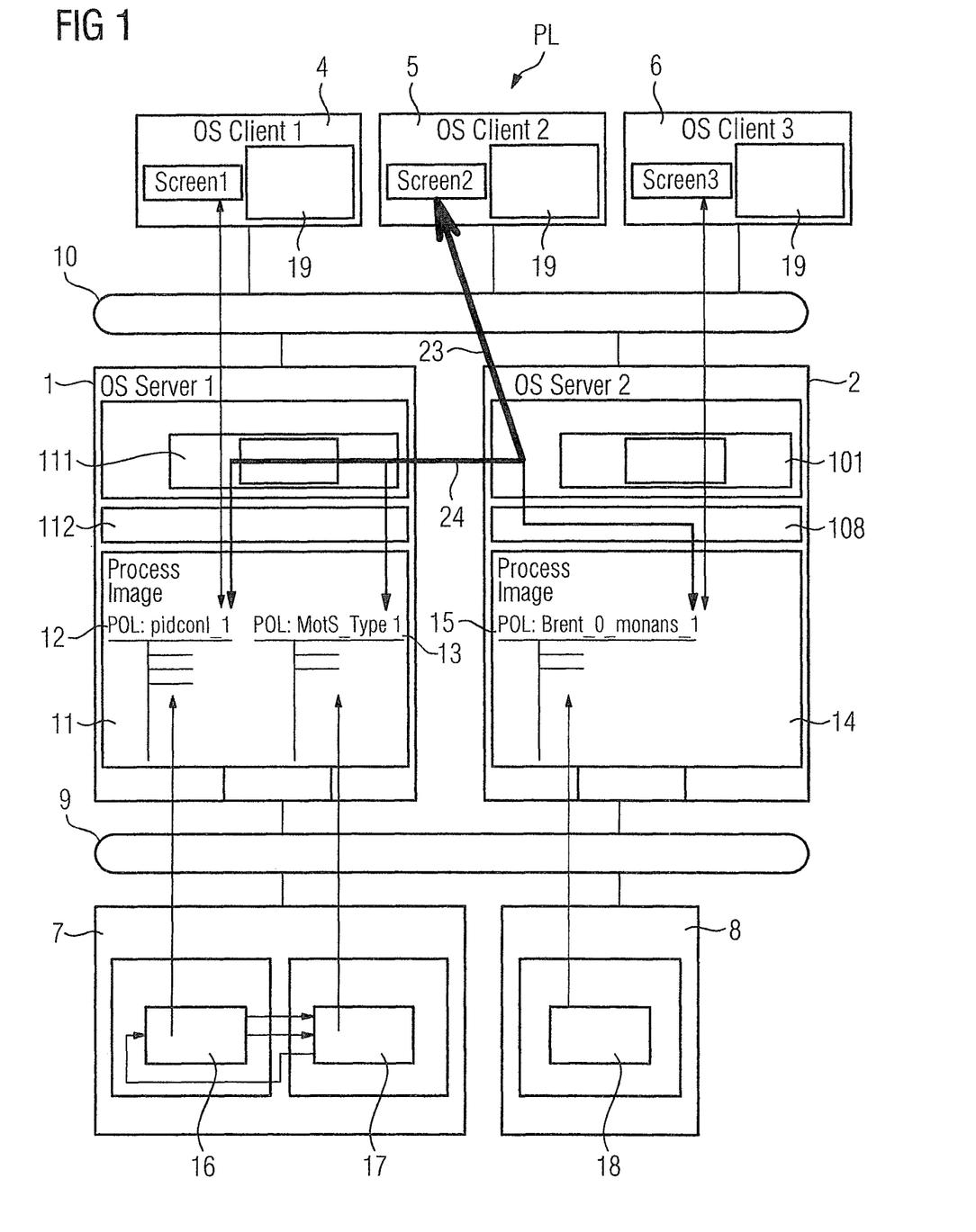
FIGS. 1 and 2 show component parts of a process control system in accordance with the invention.
Figure 2:
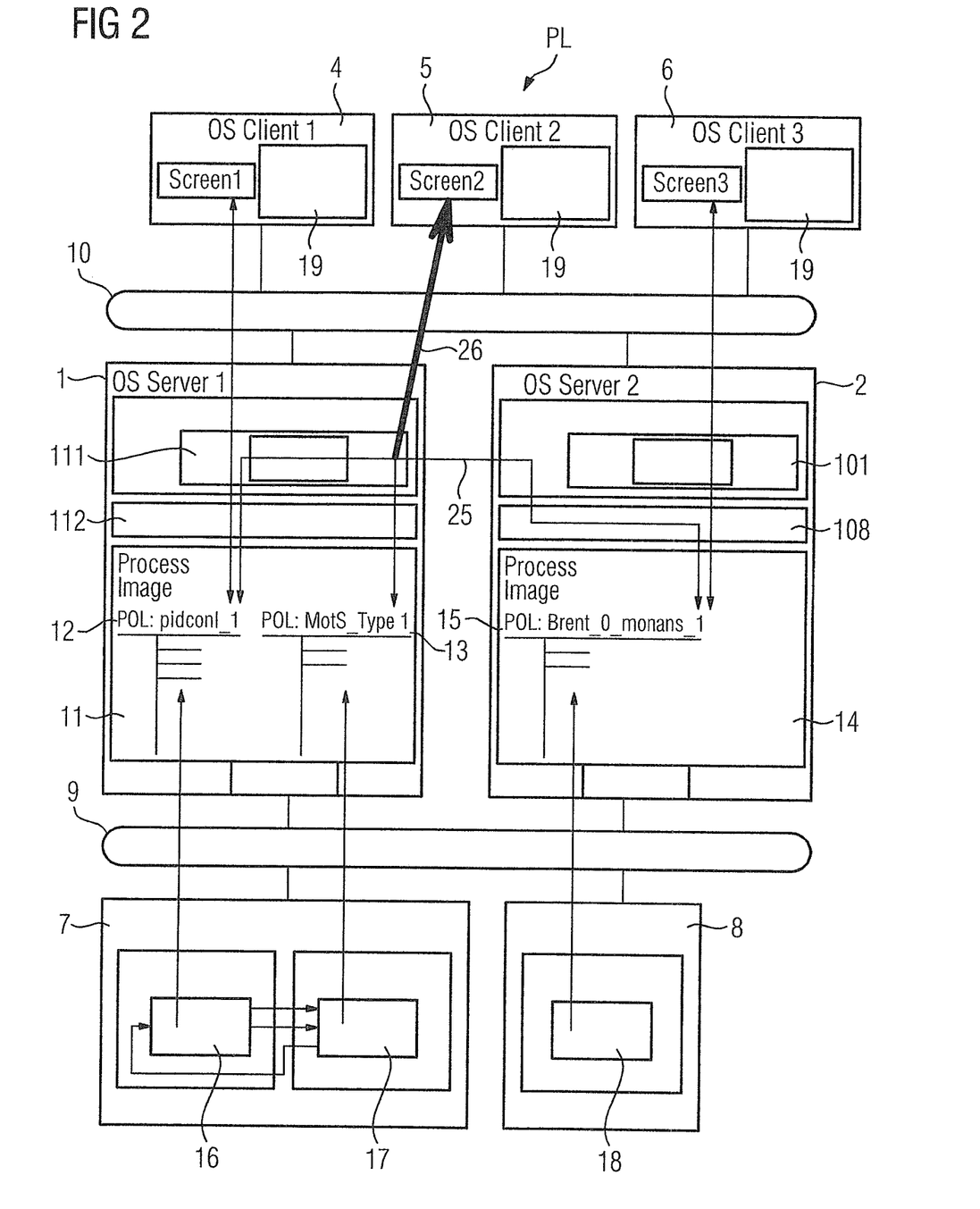

Integral parts of a process control system are referred to with PL in FIGS. 1 and 2, which, in the present exemplary embodiment, comprises a first operator server 1 (OS server 1), a second operator server 2 (OS server 2), three operator clients 4, 5, 6 (OS client 1, OS client 2, OS client 3) and two automation devices 7, 8. The process control system PL can naturally have a plurality of automation devices which, on the one hand, are connected via a plant bus 9 to the operator servers 1, 2 and, on the other hand, via a further bus (not shown) to decentralized peripherals (likewise not shown). A plurality of field devices (sensors, actuators) are connected to these decentralized peripherals. Furthermore, only two operator servers 1, 2 and three operator clients 4, 5, 6 are shown in the present example. The process control system PL can naturally have further operator servers and further operator clients, where the operator servers 1, 2 and the operator clients 4, 5, 6 are connected to a terminal bus 10.

A process object has, as mentioned in the introduction, a number of associated facets. Therefore, in the present exemplary embodiment, a process image 11 of the first operator server 1 has a process object or a process object instance 12 of a Proportional-Integral-Derivative (PID) controller and a process object 13 for a motor. Furthermore, a process image 14 of the second operator server 2 is provided with a process object 15 for a further motor. The automation device 7 has automation or control modules 16, 17 associated with these process objects 12, 13 and the automation device 8 has an automation or control module 18 associated with the process object 15. Furthermore, the operator clients 4, 5, 6 are each provided with a user interface, which have faceplates and block symbols 19 of one or more system images associated with these process objects, where the block symbols of a system image are provided for process monitoring and the faceplates of a system image are provided for process control or process operation. During the process control, the block symbols indicate current process values relating to process variables, parameters and alarm identifiers of the process objects, where within the scope of the process control using the faceplates, (target) parameters of the process objects are entered or changed and/or deleted.

The current process data of the process objects is fed to the operator client 4, 5, 6, which has registered with one of the operator servers 1, 2, via this operator server, where the current process data is transmitted by the automation devices 7, 8 to the operator servers 1, 2, for storage in the process image modules 12, 13, 15 of the process images 11, 14 associated with the process objects.

It is assumed below that the operator client 5 has registered with the second operator server 2 in order to update block symbols 20, 21, 22 (FIG. 3) of a system image. On account of this registration, the second operator 2 functions as a local (operator) server and the first operator server 1 functions as a remote (operator) server. As explained, the remote server 1 has the process image modules 12, 13 and the local server 2 has the process image module 15. This means that the local server 2 must firstly obtain the current process data stored in the process image modules 12, 13 from the remote server 1, in order, finally, to be able to provide or supply this process data and the process data of its process image module 15 to the operator client 5, which is indicated in FIG. 1 by a "wide" communication bar 23. On account of the number of process data of the process image modules 12, 13 of the remote server 1 being higher than the number of process data of the process image module 15 of the local server 2, the communication or cross-communication load between the remote server 1 and the local server 2 is high, which is clarified in FIG. 1 by a communication bar 24 shown in wide form.

This high cross-communication load between the remote server 1 and the local server 2 indicates an unfavorable client-server connection, a connection between the operator client 5 and the remote server 1 would, as indicated again below, be the better choice with respect to the cross-communication load.

In order, within the scope of updating or dynamic sampling of the block symbols of a system image, to point an operator to the communication load between the operator servers, the operator server functioning as a local server determines the number of process data stored on the operator servers for the block symbols from a data structure of the system image. A check is therefore performed to determine on which of the operator servers the majority of process data is stored, where the result of this check is supplied to the registered operator client.

Figure 4:
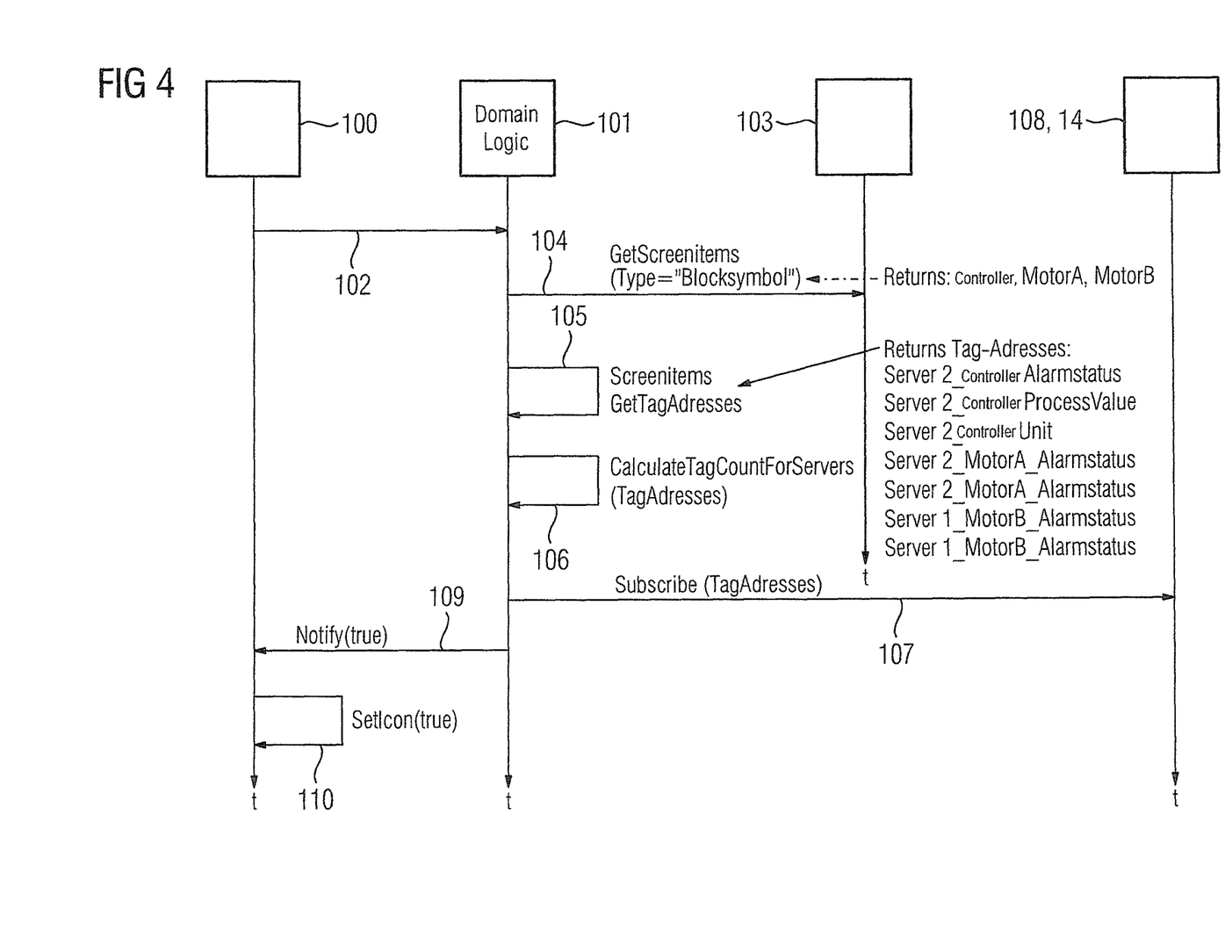
FIG. 4 shows a sequence or interaction diagram in accordance with the invention.

For more details, reference is made below to FIG. 4, in which a sequence or interaction diagram is shown.

Figure 5:
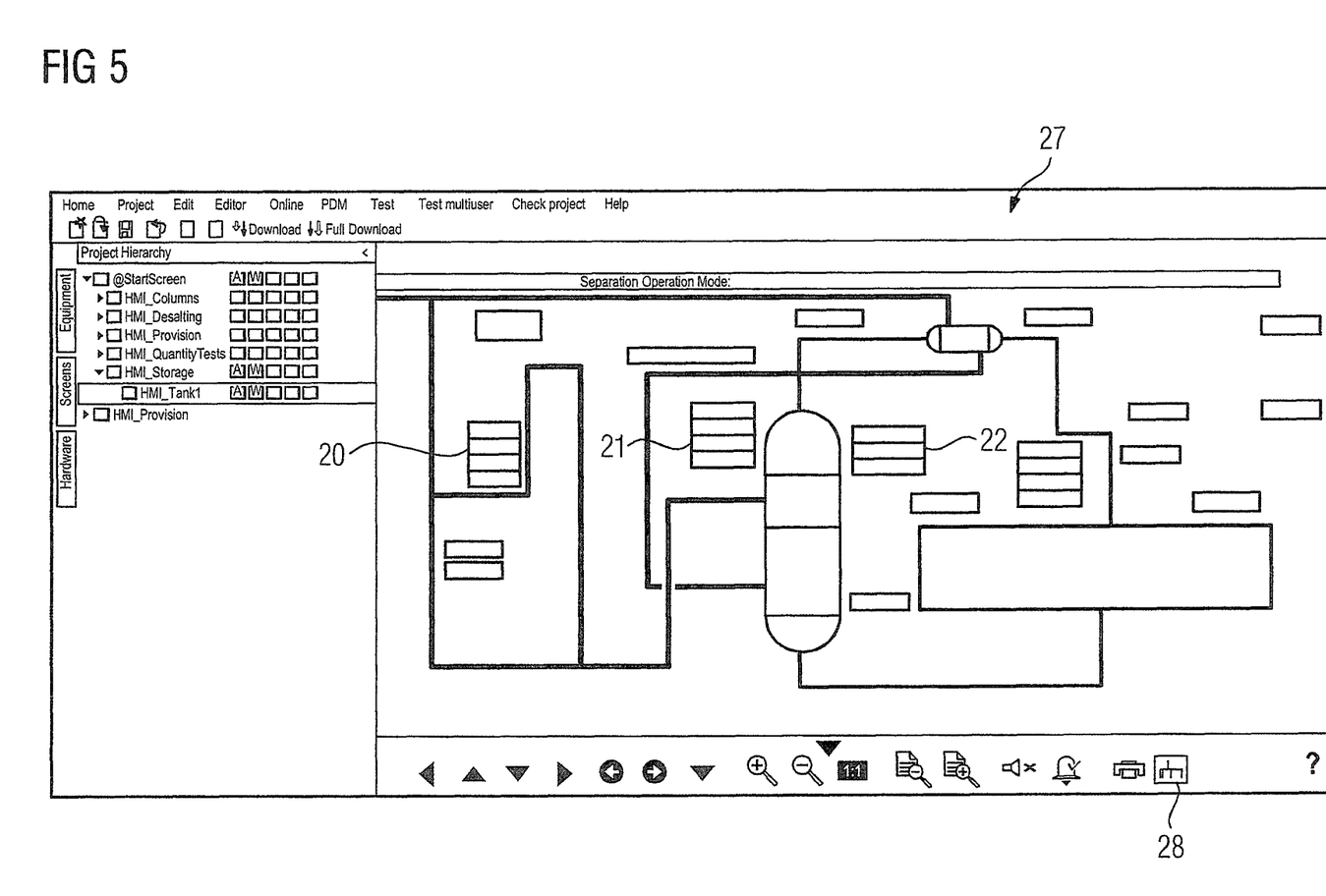
FIG. 5 shows a system image in accordance with the invention.

It is assumed that the operator client 5 for updating the block symbols 20, 21, 22 (FIGS. 3 and 5) of a system image 27 has registered with the second operator server 2, which, on account of this registration, functions as a local server 2 and the first operator server 1 as a remote server 1.

Figure 3:
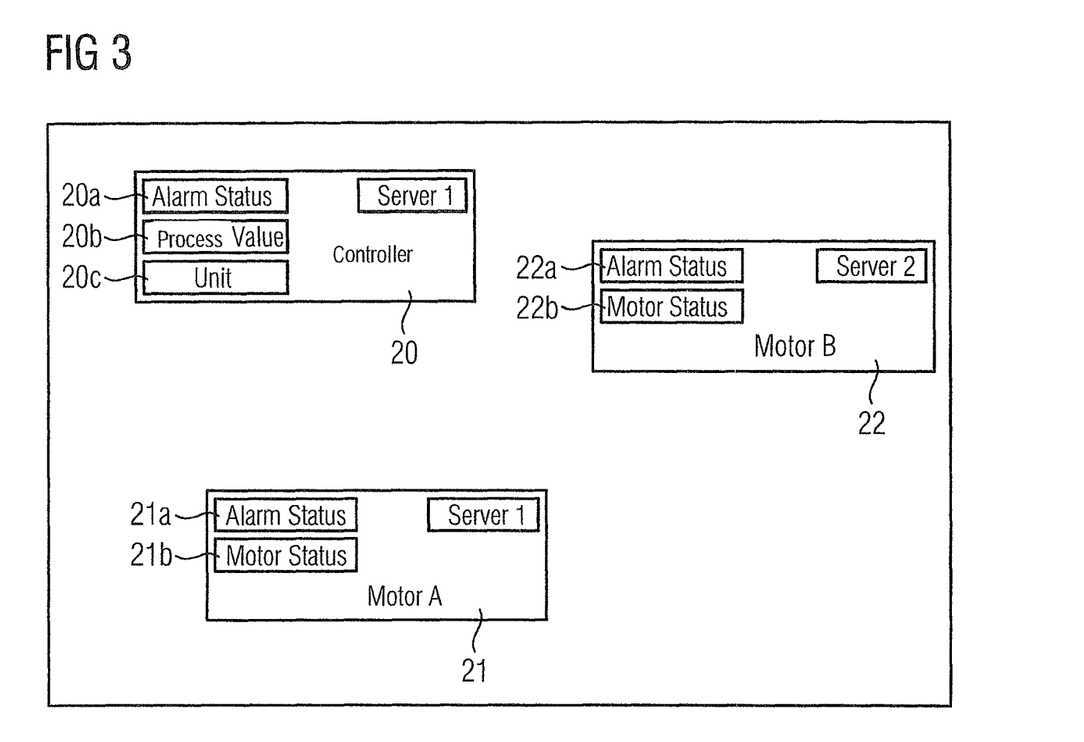
FIG. 3 shows block symbols of a system image in accordance with the invention.

It is also assumed that the process image module 12 stored on the remote server 1, which is represented on the operator client 5 by the block symbol 20, has three so-called tags. A tag usually comprises the address of a process image module of a process object in the process image of a server and an associated process value. The process image module 13 stored on the remote server 1, which represents the block symbol 21, conversely has two tags. Furthermore, the process image module 15 of the local server 2 is provided with two tags, where the block symbol 22 is represented by the process image module 15.

For the sake of improved clarification and simplicity, the tags of the process image modules 12, 13, 15 are indicated in FIG. 3 with reference characters 20a, 20b, 20c, 21a, 21b, 22, 22b of the block symbols 20, 21, 22.

In order to update the block symbols 20, 21, 22, a user interface 100 of the operator client 5 of a software runtime component 101 of the local server 2 transmits an instruction 102, such as in the form of an instruction "open system image". On account of this instruction 102, the software runtime component 101 accesses a data structure 103 of the system image 27 stored on the local server 2, which is shown in FIG. 4 via the reference character 104. The data structure 103 has what are known as screen items, which typically comprise the tag addresses of the block symbols, data for identification, description and positioning of image objects in the system image 27 and further data required for displaying the system image 27 on the respective operator client. In order to update the block symbols 20, 21, 22, it is sufficient only to "run through" the data structure 103 for screen items of type "block symbols", in order to read out the corresponding tag addresses for the process image modules 11, 12, 15 for the block symbols, which is indicated in FIG. 4 by a reference character 105. In a next step 106, the software runtime component 101 of the local server 2 determines or counts the number of tags or the number of tag addresses of the process image modules 11, 12, 14, where the software runtime component 101 in the present exemplary embodiment identifies that five tags or tag addresses relate to the process image 11 of the remote server 1 and two tags or tag addresses relate to the process image 14 of the remote server 2. This means that within the scope of the current client-server connection between the operator client 5 and the local server 2, a high cross-communication is required between the local server 2 and the remote server 1, in order to provide all process data, i.e., the process data both of the local server 2 and also that of the remote server 1, to the operator client 5 via the local server 2. The tags or tag addresses are fed to a runtime system in a further step 107, which comprises the process image 14 and an event management component 108 of the local server 2. On account of these tags or tag addresses, the runtime system 14, 108 can transfer the process values stored in the process image modules 11, 12, 14 to the block symbols 20, 21, 22 corresponding to these modules, as a result of which these block symbols are supplied with current process values, where the runtime system 14, 108 transfers process value changes to the user interface 100 (reference character 109).

On account of the software runtime component 101 identifying that five tags or tag addresses relate to the process image 11 of the remote server 1 and two tags or tag addresses relate to the process image 14 of the remote server 2, the software runtime component 101 of the local server 2 proposes a new client-server connection to the operator client 5 (reference character 110). In the present exemplary embodiment, it is proposed that the operator client 5 is subsequently to register with the remote server 1, where the suggestion is indicated to an operator or a user of the operator client 5. In the event that the operator client 5 subsequently registers with the remote server 1, this functions as a new local server 1, and the "old" local server 2 functions as a new remote server. The evaluations relating to the most favorable client-server connection assume in this case a runtime component 111 of the operator server 1 (new local server) and a runtime system of this operator server 1, which comprises the process image 11 and an event management system 112.

As mentioned, in the present exemplary embodiment the local server 2, in order to update the block symbols 20, 21, 22 with the current process data, identifies that the connection between the operator client 5 and the remote server 1 with respect to the communication load between the servers 1, 2 is most favorable. In this case, only the few process values of the process image module 15 are to be transmitted by the operator server 2 to the operator server 1 (shown in FIG. 2 via a narrow communication bar 25), in order to be able to provide or supply these process values and the current process values of its process image modules 12, 13 to the operator client 5 (indicated in FIG. 2 via a wide communication bar 26).

The local server 2, with which the operator client 5 has registered, notifies the operator client 5 of the more favorable client-server connection or thereover that a more favorable client-server connection can be established. In this regard, in the system image 27 shown on the operator client 5, (FIG. 5), which comprises the block symbols 20, 21, 22, further block symbols, image symbols for representing system components and superimposed faceplates, a symbol 28 is indicated, which refers an operator to the fact that a more favorable client-server connection is established between the servers with regard to a lower cross-communication load. According to a predetermined time span or following a corresponding operator input on the operator client 5, this more favorable client-server connection is finally established, where in both instances the operator client 5 registers with the remote server 1, which thereupon functions as a (new) local server. After this registration, the process values of the process image module 15 (FIG. 2) are transmitted by the second operator server 2 (old local server 2, new remote server 2) to the first operator server 1 (new local server 1, old remote server 1), which provides or supplies these process values and the current process values of its process image modules 12, 13 to the operator client 5.

It is assumed below that the more favorable client-server connection is established after a suitable operator input.

A suitable operator input can be effected, for example, by the operator actuating or selecting the symbol 28 via a "mouse", as a result of which a dynamically composed connection image opens, in which the current connection situation with the corresponding communication bars is shown and the evaluated and more favorable connection is indicated.

Figure 6:
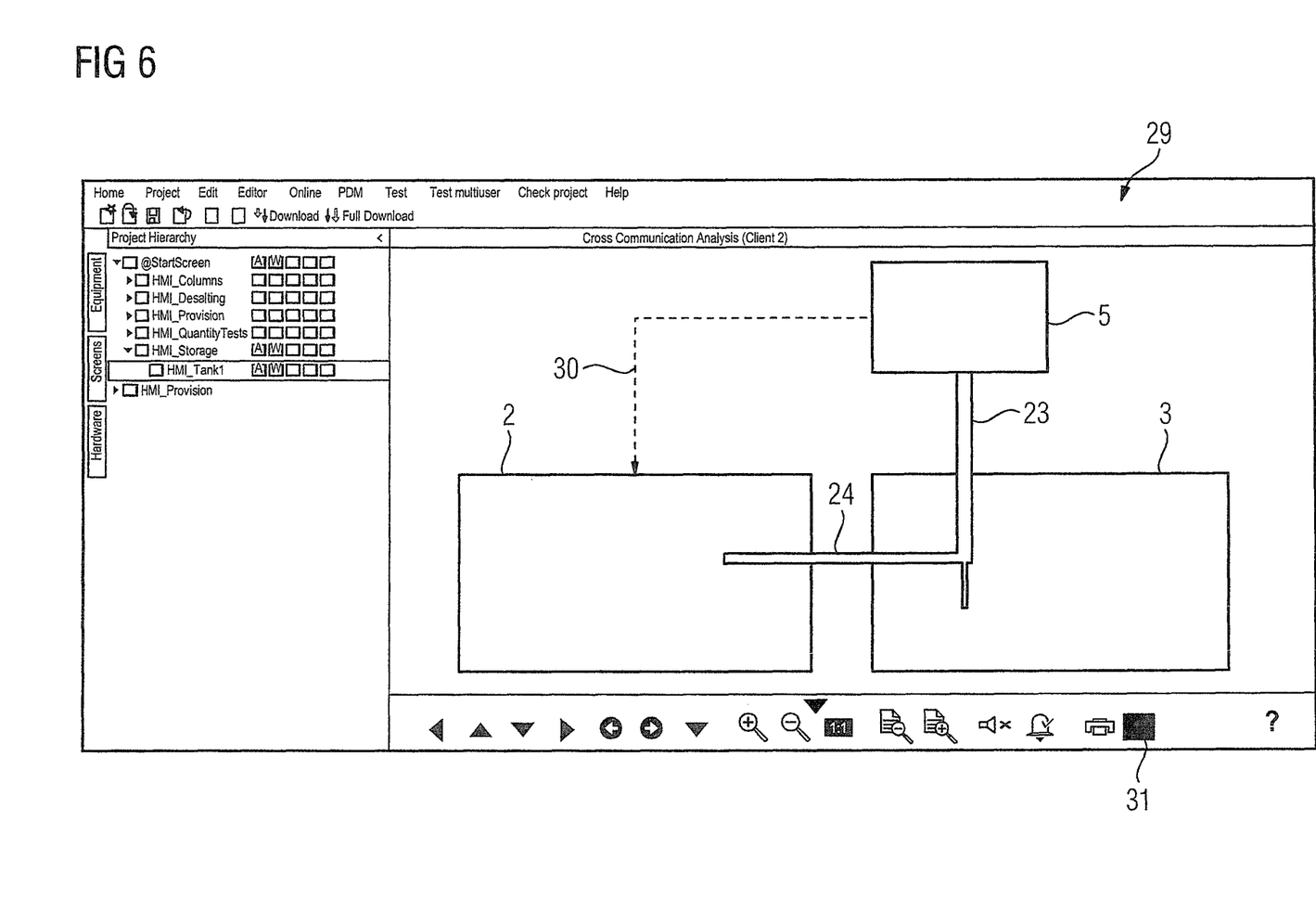
FIGS. 6 and 7 show visualizations of client-server connections in accordance with the invention.
Figure 7:
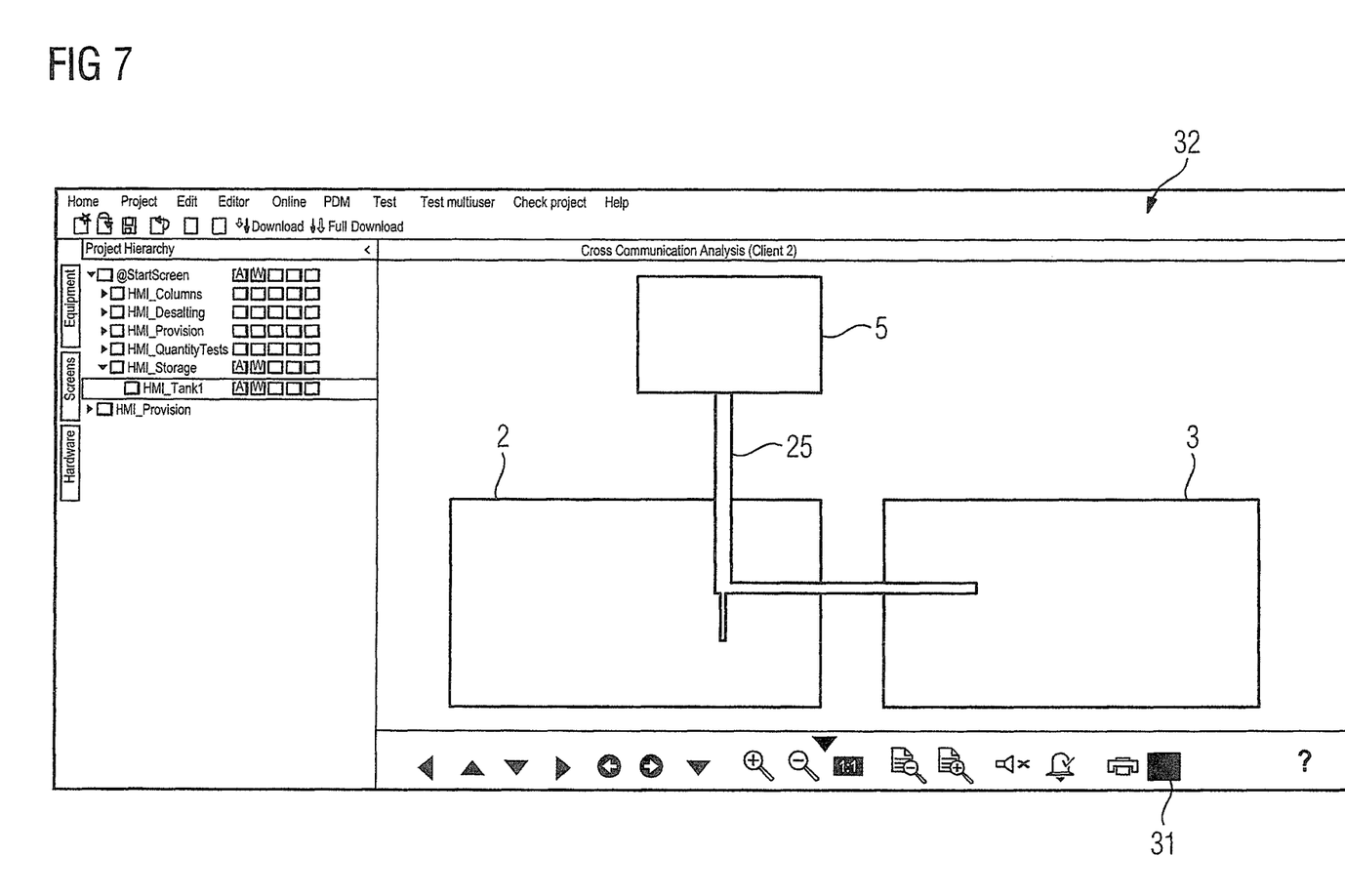

FIGS. 6 and 7 each show one such connection image that can be displayed on the operator client 5, where the same reference characters are used below for the sake of simplicity for the image components present in FIGS. 6 and 7 and representing the operator servers 1, 2 and the operator client 5. In FIG. 6 the more favorable connection is indicated to an operator in a connection image 29 via a dashed line or an arrow 30, where the representation in the connection image 29 is naturally restricted to the operator server 1, 2 and the operator client 5 for the actual connection and suggested connection (dashed line 30).

In the event that the operator decides on the proposed more favorable connection, he can activate this by selecting a symbol 31 in the connection image 29. If the switchover is performed, which means that the operator client 5 has registered with the operator server 1, then the new client-server connection is visualized in a further connection image 32 (FIG. 7). In the event that the operator selects the symbol 31 again, the operator client 5 re-registers with the operator server 2 and the original connection image 29 is superimposed again.

The switchover introduced manually by the operator can naturally take place automatically, so that for instance on the basis of a statistical evaluation of the image wait times of different operators ("how long has which operator opened which image?") a suitable server choice can already be derived with the registration of the operator.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An arrangement with operator servers and operator clients, comprising:
    process image modules each associated with respective process objects; said process image modules each having tags stored in the operator servers in a process image,
    wherein an operator server, with which one operator client register of operator client registers, functions as a local server and another operator server functions as a remote server, the local server receiving the tags stored in the remote servers;
    wherein each of the operator clients is configured to register with one operator server of the operator servers to establish a client-server connection, and is further configured to display a system image with block symbols associated with the respective process objects;
    wherein in order to update the block symbols of the system image the local server transmits the process data of the local server and the process data of the remote server to a registered operator client via the client-server connection;
    wherein the operator server functioning as the local server determines for respective block symbols from at least one data structure of the system image tags or tag addresses of the process image modules and a number of tags or tag addresses of the respective process image module; and
    wherein the local server proposes a new client-server connection to the registered operator client as a function of the number of tags or tag addresses.

2. The arrangement as claimed in claim 1, wherein as a function of a number after a predetermined time span or after an operator input, the registered operator client registers with one remote server of remote servers to establish a new client-server connection which functions as a new local server after the registration.

3. The arrangement as claimed in claim 1, wherein the client-server connections are visualized on the registered operator client.

4. The arrangement as claimed in claim 2, wherein the client-server connections are visualized on the registered operator client.

5. A process control system with the arrangement in accordance with claim 1.

* * * * *